US012752304B2

(12) United States Patent
Davis

(10) Patent No.: US 12,752,304 B2
(45) Date of Patent: Oct. 6, 2026

(54) COMPOUND AUGER DISC

(71) Applicant: CP MANUFACTURING, INC., San Diego, CA (US)

(72) Inventor: Nicholas Davis, San Diego, CA (US)

(73) Assignee: CP MANUFACTURING, LLC, San Diego, CA (US)

( * ) Notice: Subject to any disclaimer, the term of this patent is extended or adjusted under 35 U.S.C. 154(b) by 0 days.

(21) Appl. No.: 19/142,020

(22) PCT Filed: Apr. 7, 2025

(86) PCT No.: PCT/US2025/023512
§ 371 (c)(1),
(2) Date: Jun. 20, 2025

(87) PCT Pub. No.: WO2025/235125
PCT Pub. Date: Nov. 13, 2025

(65) Prior Publication Data
US 2026/0108915 A1 Apr. 23, 2026

Related U.S. Application Data

(60) Provisional application No. 63/643,382, filed on May 6, 2024.

(51) Int. Cl.
*B07B 1/16* (2006.01)
*B07B 1/46* (2006.01)

(52) U.S. Cl.
CPC .............. *B07B 1/16* (2013.01); *B07B 1/4609* (2013.01)

(58) Field of Classification Search
CPC ............ A01D 17/06; B07B 1/145; B07B 1/15
USPC ................................ 209/261, 361, 362, 672
See application file for complete search history.

(56) References Cited

U.S. PATENT DOCUMENTS

| | | | | |
|---|---|---|---|---|
| 3,015,258 | A | 1/1962 | Apel | |
| 6,250,478 | B1 * | 6/2001 | Davis | B07B 1/15 209/660 |
| 8,991,616 | B2 * | 3/2015 | Parr | B07B 1/06 209/672 |
| 10,406,560 | B1 * | 9/2019 | Davis | B07B 1/145 |
| 2011/0303587 | A1 | 12/2011 | Doppstadt | |
| 2020/0101493 | A1 | 4/2020 | Davis | |
| 2021/0031237 | A1 | 2/2021 | Ecostargreen | |

FOREIGN PATENT DOCUMENTS

| | | |
|---|---|---|
| EP | 1005918 | 6/2000 |

OTHER PUBLICATIONS

International Search Report for PCT/US2025/023512 dated Jun. 17, 2025 (10 pages).

* cited by examiner

*Primary Examiner* — Molly K Devine
(74) *Attorney, Agent, or Firm* — Manuel de la Cera

(57) ABSTRACT

A disc for mounting on a disc shaft with a shaft axis is disclosed. The disc includes a leading face that pushes material along an axial conveyance direction that is parallel to the shaft axis. The leading face is constructed of a hard and durable structural material. The disc may also include a distal face/edge constructed of the pliable elastomeric material. The disc also includes a trailing face opposite to the leading face. The trailing face is constructed of a pliable elastomeric material. The discs may be of a wraparound construction or a clamshell construction. The discs can be use in a larger disc screen.

35 Claims, 9 Drawing Sheets

FIG. 2A2

COMPOUND AUGER DISC

CROSS-REFERENCE TO RELATED APPLICATIONS

This application is the Section 371 national filing of PCT Application PCT/US25/23512 entitled "COMPOUND AUGER DISC" filed on Apr. 7, 2025, which in turn claims priority to U.S. application 63/643,382 filed on May 6, 2024, titled COMPOUND AUGER DISC. These applications are incorporated by reference in their entireties.

FIELD OF THE INVENTION

The present invention relates generally to machines used to sort materials and mixed recyclable materials.

BACKGROUND OF THE INVENTION

A disc screen is a machine commonly known to separate material by size, and is used widely in industries such as mining and aggregate. Disc screens with rubber discs are used to separate items by shape, especially in solid waste sortation facilities. A series of parallel, rotating shafts act as a roller conveyor, and flat items can adhere to the rollers and are conveyed forward, while cubic or round items bounce off the roller and fall backward. Disc screens are generally known to have high throughput relative to their capital expense and footprint, making them a common equipment choice in recycling facilities.

Disc screens are prone wo wrapping on long, stringy material. Material wrapping requires cleaning of the screen to remove the wrappings. The more wrapping type material there is in the material stream, the more the machine needs to be cleaned, requiring frequent stopping of the system and large amounts of labor. If a screen is not cleaned, it causes increased wear on parts and eventually causes the machine to jam and shut down. For this reason, disc screens are not usable in difficult solid waste streams, such as municipal solid waste (MSW). MSW has a large amount of textiles, fabrics, leathers, and other wrapping items, in addition to having a large amount of film plastics. A typical material composition will have 6% textiles and 10% film plastics.

Auger screens or screw screens are a type of disc screen in which the disc is replaced by a continuous screw or spiral, resulting in a series of parallel screws. Each of the screws is cantilevered from the same side. Material which wraps on a shaft is engaged by the flights of adjacent shafts, which act as a screw conveyor and pushed the wrapped material off the open end of the shaft. For this reason, auger screens are highly resistant to wrapping and jamming. Auger screens have widely replaced disc screens as sizing screens within recycling facilities and solid waste sortation facilities. However, so far auger screens have not been able to replicate the shape separation function of rubber disc auger screens.

There have been several attempts to add rubber discs to auger screens in the past. For example, Wess (EP2943292A1) teaches of a type of rubber finger screen for use in an auger screen and Davis (U.S. Pat. No. 11,207,713B2) teaches of a type of clamshell style lobed rubber disc for use in auger screens.

However, these prior inventions are insufficient. Primarily, and auger screen is not just a roller conveyor but also a series of screw conveyors. Each screw conveyor is used to convey wrapped material off the adjacent shaft, and it occurs that the flight of the screw conveyor and the wrapped material are rotating in opposite directions when the flight engages the wrapped material. This causes a large amount of rubbing of the wrapped material on the conveyance surface of the screw conveyor. Steel, and other structural metals, are typically hard enough that this rubbing of items such as textiles and plastics will not cause wear on the surface of the metal. However, rubber is much softer than steel. As a result, rubber discs used in an auger screen experience extremely fast wear on the axial conveyance surface when used on material streams with a large amount of wrapping material. As this surface wears away, eventually the disc is worn entirely though, and the gap from flight to shaft grows to such a point that the flight no longer engages wrapped material, allowing the auger screen to wrap like a disc screen. A typical rubber disc has a lifespan of 2000 to 4000 hours when properly cleaned and maintained. A rubber disc used in an auger screen will wear out to the point of being non-functional in approximately 100 hours.

A better kind of rubber disc for use in an auger screen is needed.

SUMMARY OF THE INVENTION

A disc for mounting on a disc shaft with a shaft axis is disclosed. The disc includes a leading face that pushes material along an axial conveyance direction that is parallel to the shaft axis. The leading face is constructed of a hard and durable structural material. The disc also includes a trailing face opposite to the leading face. The trailing face is constructed of a pliable elastomeric material.

The discs may be of a wraparound construction or a clamshell construction. The clamshell construction may include a first part and a second part. When mounted to a disc shaft, the first part is mounted in a staggered position relative to the mounting of the second part. The clamshell disc may include a structural insert.

The structural material may be a metal, such as, but not limited to, stainless steel. The elastomeric material may be, but is not limited to, rubber or plastic. An outer edge of the elastomeric material may extend beyond an outer edge of the structural material.

An auger may be constructed with a plurality of discs mounted to the disc shaft. And a disc screen may be constructed with a plurality of augers mounted to a support frame that maintains each auger in the plurality parallel to the adjacent auger in the plurality. A motor or set of motors may be connected to the disc shafts in the plurality of augers, wherein the motor or set of motors rotates the disc shafts.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 2A2 is an enlarged view illustrating the outer edge of the elastomeric material extending beyond an outer edge of the structural material.

DETAILED DESCRIPTION OF THE INVENTION

Figure 1B:
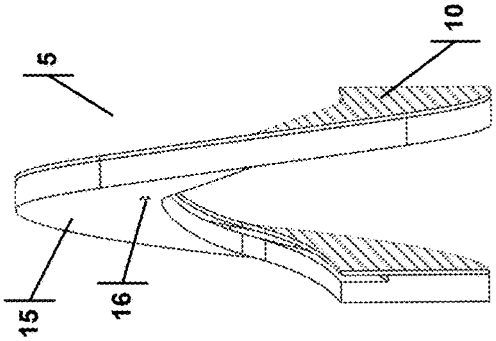
FIG. 1B is a side view of the wraparound disc of FIG. 1A.
Figure 1A:
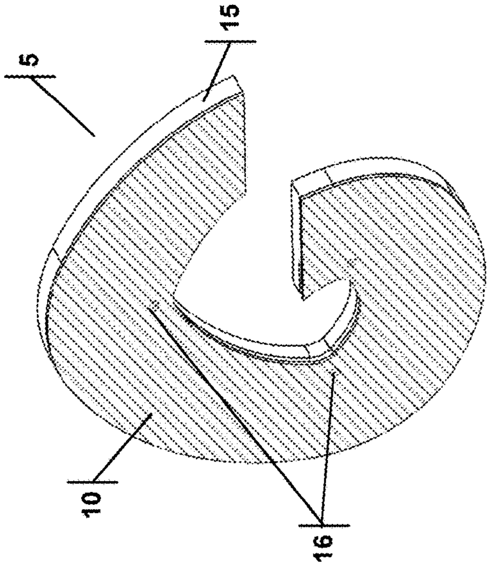
FIG. 1A is a structural material side view of a wraparound disc.
Figure 1C:
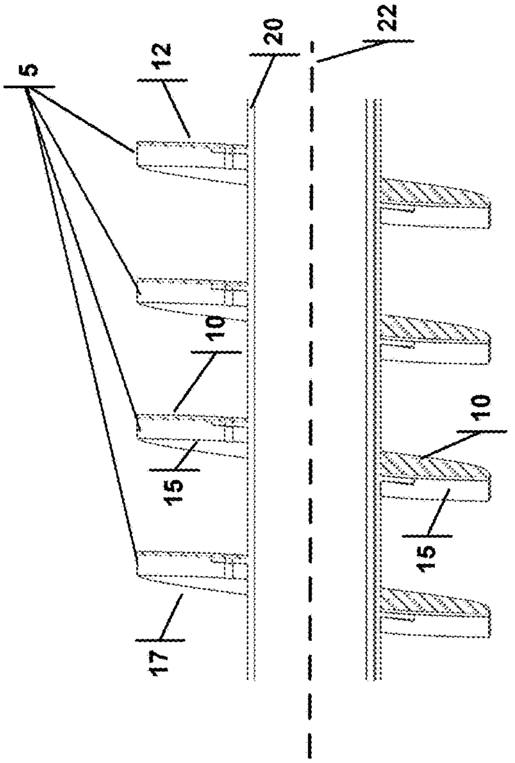
FIG. 1C illustrates several wraparound discs mounted to a shaft.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

| | |
|---|---|
| Wraparound Disc | 5 |
| Structural Material | 10 |
| Leading Face | 12 |
| Distal Face/Edge | 13 |
| Elastomeric Material | 15 |
| Sacrificial Elastomeric Material | 15A |
| Affixing Structure | 16 |
| Trailing Face | 17 |
| Elastomeric Material Over Extension | 19 |
| Disc Shaft | 20 |
| Shaft Axis | 22 |
| Axial Conveyance Direction | 25 |
| Wraparound Auger | 30 |
| Radial Conveyance Direction | 35 |
| Disc Screen (Wrap Around) | 40-1 |
| Disc Screen (Clamshell) | 40-2 |
| Motor | 45 |
| First Clamshell Part | 50 |
| Second Clamshell Part | 55 |
| Structural Insert | 60 |
| Clamshell Disc | 65 |
| Clamshell Auger | 70 |
| Clamshell Staggering | 75 |
| Support Frame | 80 |

According to the disclosure, a type of disc for an auger screen is made of both structural and elastomeric materials. The structural material, such as steel, is placed at least on the leading surface of the auger. The elastomeric material, such as rubber, is placed at least on the trailing surface of the auger. In such a configuration the augers, which convey material in an axial conveyance direction, are made of the structural material which is resistant to wear. The roller conveyor (i.e., several augers placed side-by-side) which conveys material in the radial conveyance direction, is made of an elastomeric material which provides sufficient friction to act as a shape sorter.

Turning to FIGS. 1A-1G, a wraparound disc 5 is illustrated. The wraparound disc 5 includes a leading face 12 that pushes material along an axial conveyance direction 25 that is parallel to the disc shaft 20 and its axis 22. The leading face 12 is constructed of a hard and durable structural material 10. The disc 5 also includes a trailing face 17 opposite to the leading face 12. The trailing face 17 is constructed of a pliable elastomeric material 15. The outside distal face/edge 13 of the wraparound disc 5 may also be constructed of the pliable elastomeric material 15.

Figure 1D:
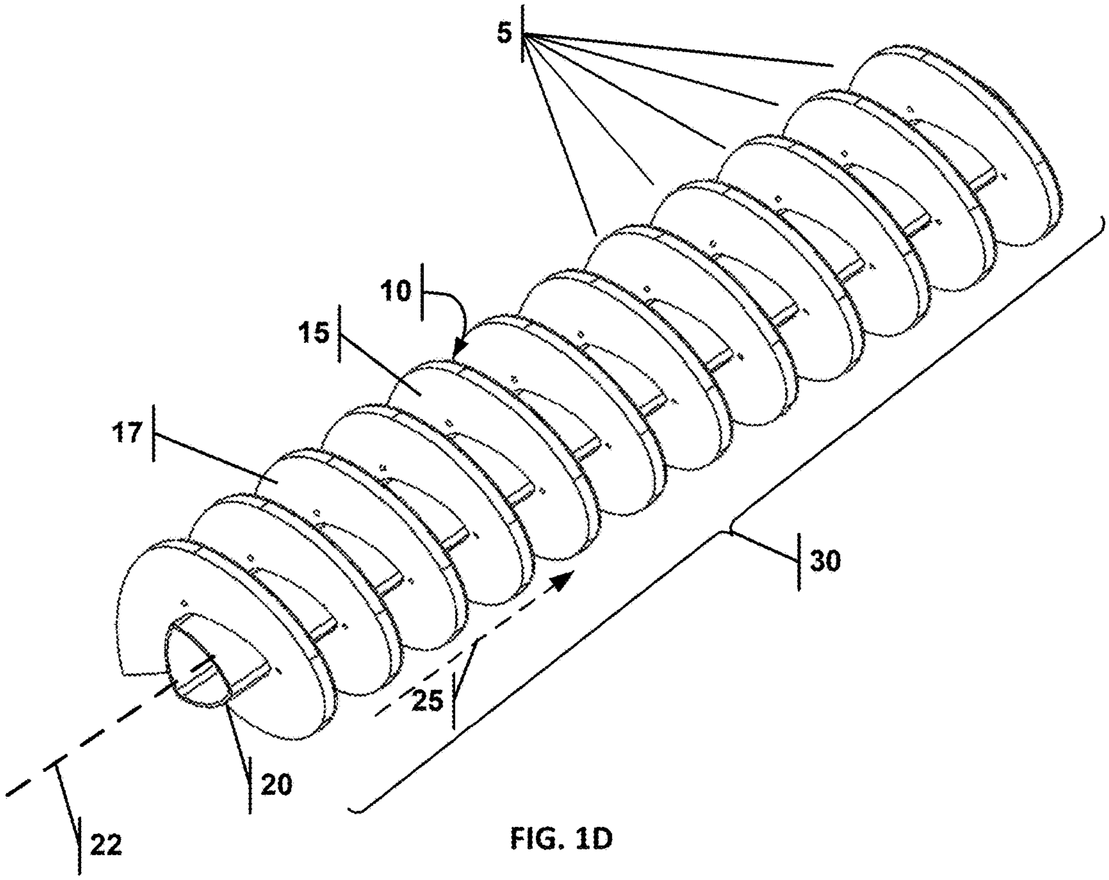
FIG. 1D is a top perspective view of an auger made from several wraparound discs, specifically showing the trailing side of the discs.
Figure 1E:
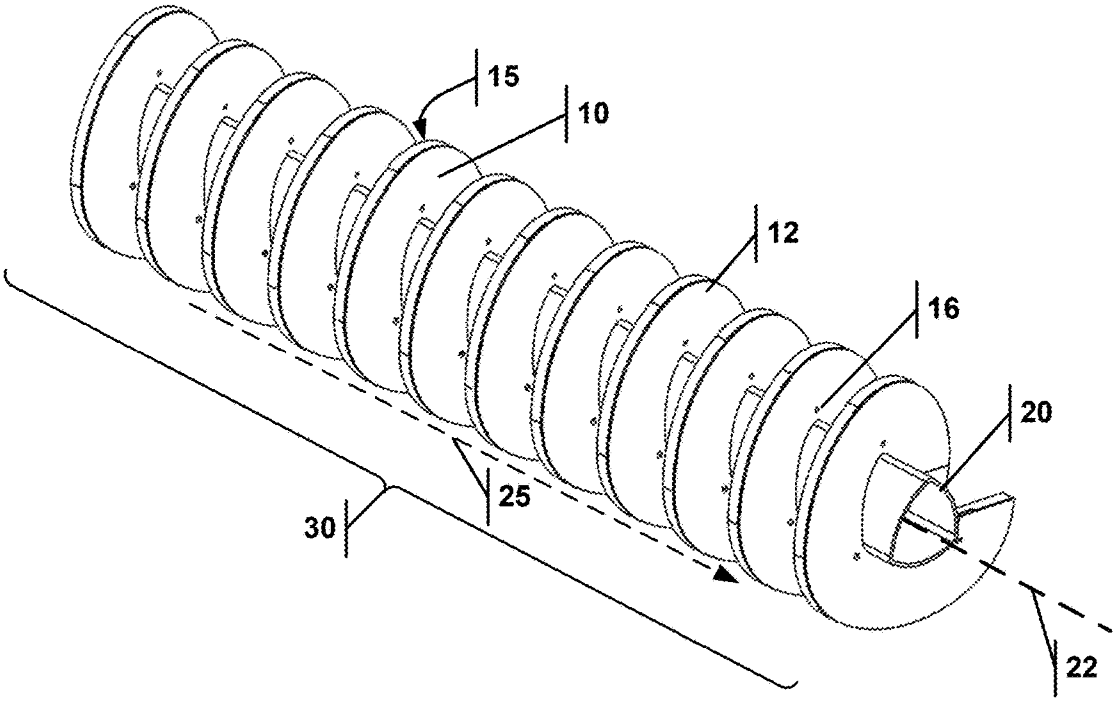
FIG. 1E is a top perspective view of an auger made from several wraparound discs, specifically showing the leading side of the discs.

FIG. 1D illustrates an auger 30 made from several wraparound discs 5, specifically showing the trailing side 17 of the discs 5. FIG. 1E illustrates the same wraparound auger 30 made from several wraparound discs 5, but this view is from the leading side 12 of the discs 5. Material that enters the wraparound auger 30 is pushed by the leading face 12—i.e., the structural material 10—in the axial conveyance direction 25. Notably, the distal face/edge 13 is the area of the wraparound disc 5 that often contacts the material.

Figure 1F:
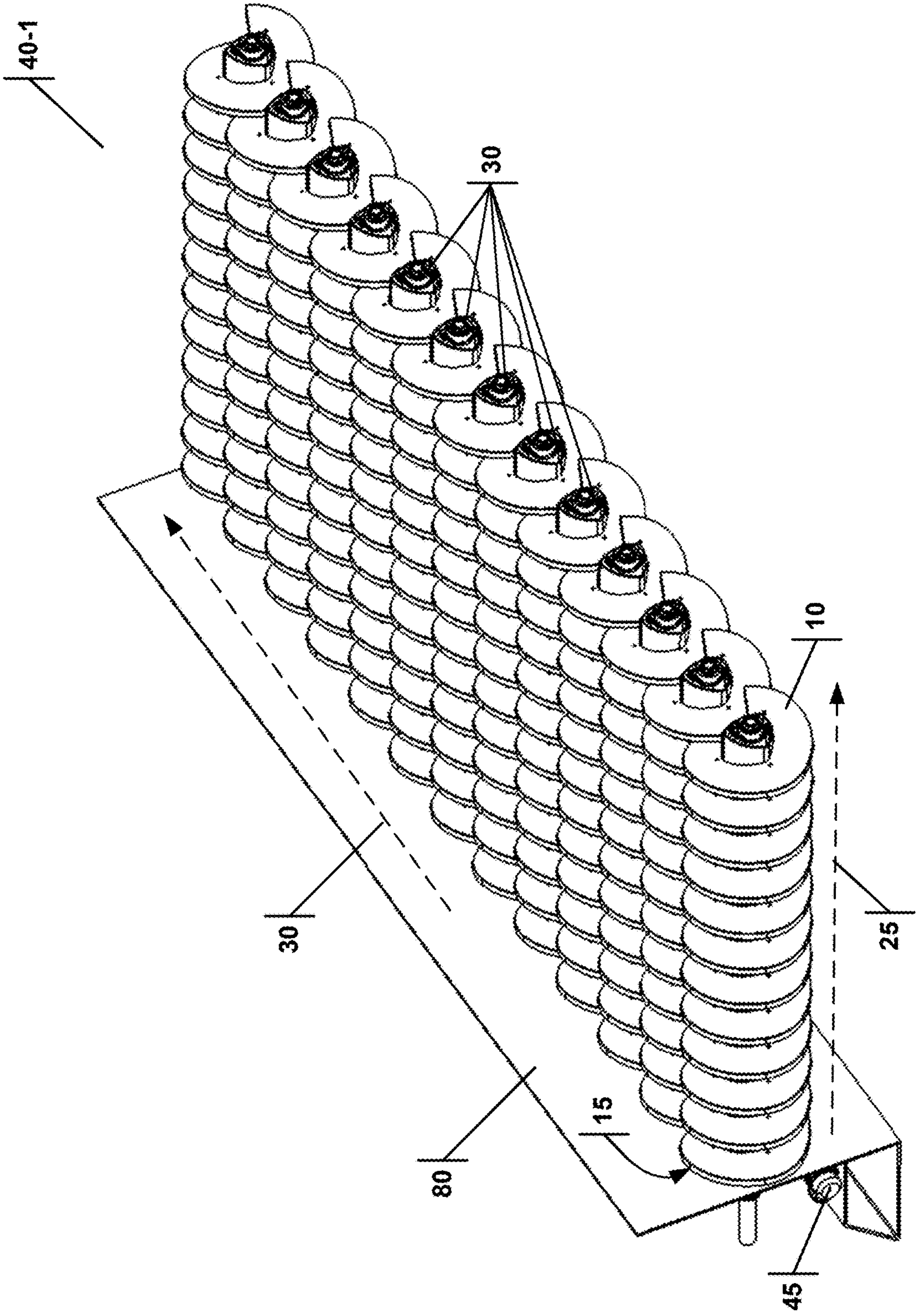
FIG. 1F is a top perspective view of a disc screen made from several augers comprised of wraparound discs.
Figure 1G:
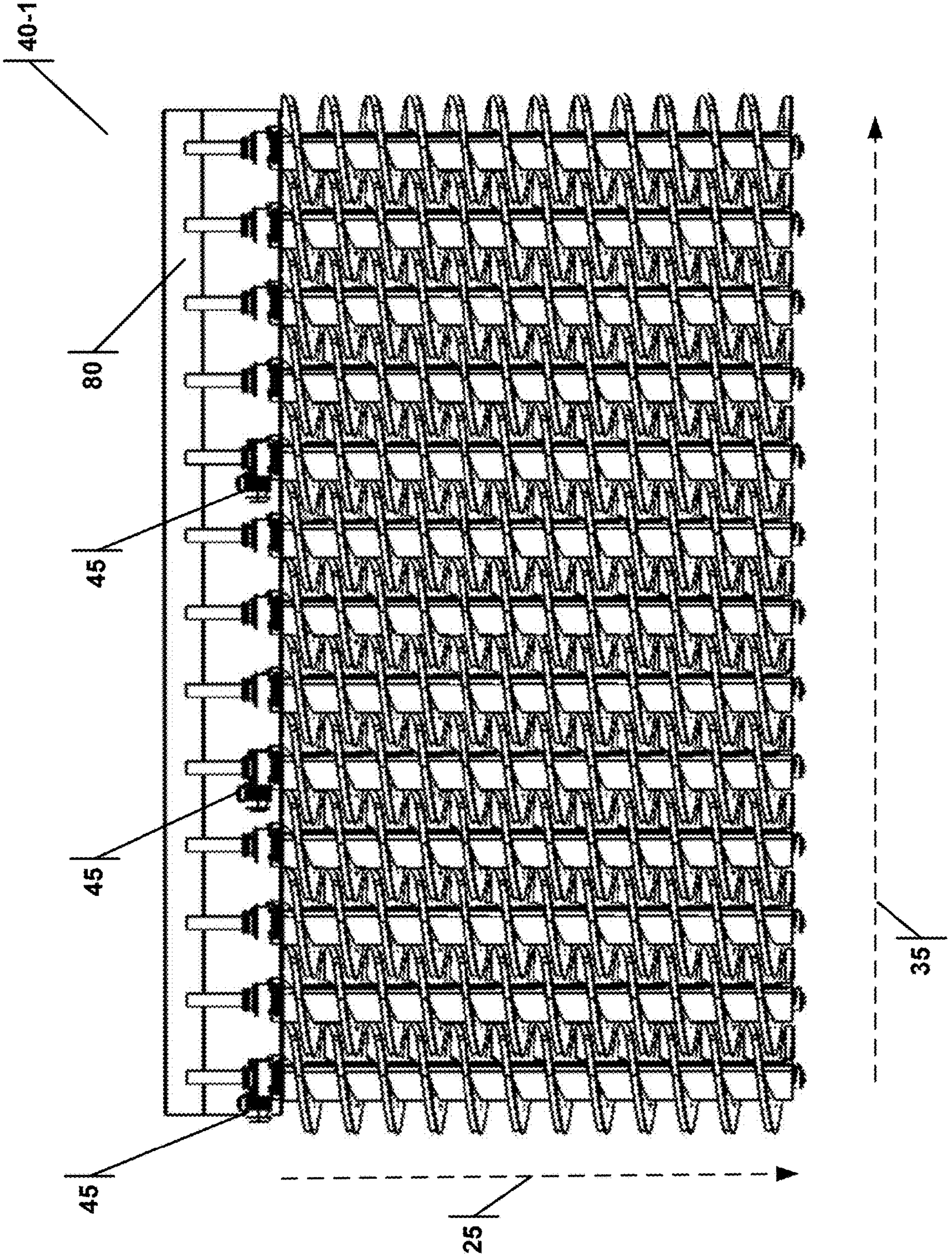
FIG. 1G is a top plan view of a disc screen made from several augers comprised of wraparound discs.
Figure 2B:
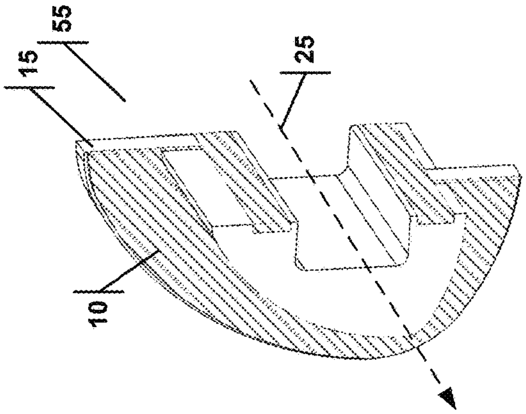
FIG. 2B is a second part of a clamshell disc.
Figure 2C:
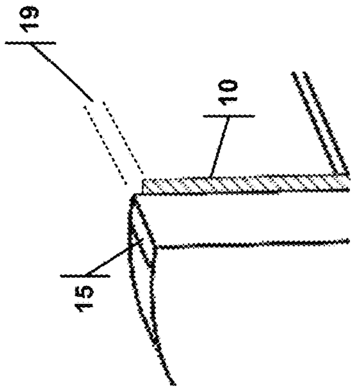
FIG. 2C is a structural insert used in the clamshell disc.
Figure 2C:
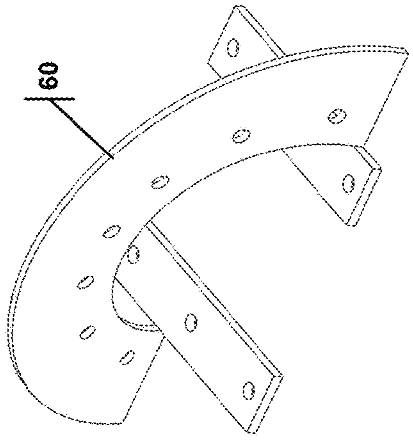
Figure 2A:
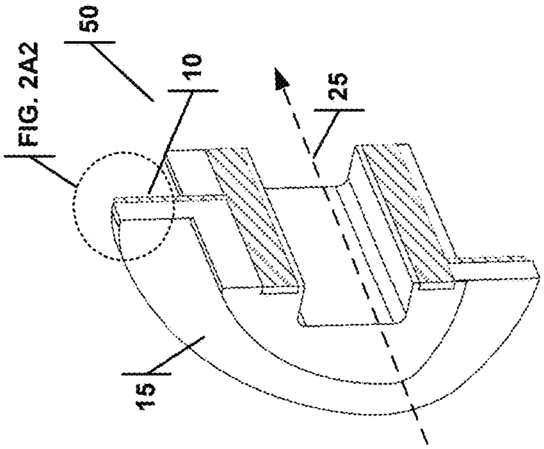
FIG. 2A is a first part of a clamshell disc.

FIGS. 1F and 1G illustrate a disc screen 40-1 made from a plurality of wraparound augers 30. A support frame 80 supports the augers 30 such that each auger 30 in the plurality is parallel to the adjacent auger 30 in the plurality. A motor 45 or set of motors 45 is connected to the disc shafts 20 in the plurality of augers 30, and rotates the disc shafts 20 which, in turn, rotates the wraparound discs 5. The disc screen 40-1 is a roller conveyor that conveys material in the radial conveyance direction 30. An outer edge of the elastomeric material 10 may extend 19 beyond an outer edge of the structural material 10 (see e.g. FIG. 2A2) to the outside distal face/edge 13 of the wraparound disc 5. Thus, the uppermost material of the disc screen bed is made of an elastomeric material 15 that advantageously provides sufficient friction to act as a shape sorter.

Turning to FIGS. 2A-2H, a clamshell disc 65 is illustrated. Specifically, the disc 65 may be made up of a first part 50 and a second part 55 that are clamped or bolts over the disc shaft 20. This design has the advantage of permitting fast replacement because a damaged disc in the auger can be replaced by simply unclamping (or unbolting) the damaged part and replacing it. Each clamshell part (50, 55) may be made with half a winding of the screw conveyor.

Figure 2D:
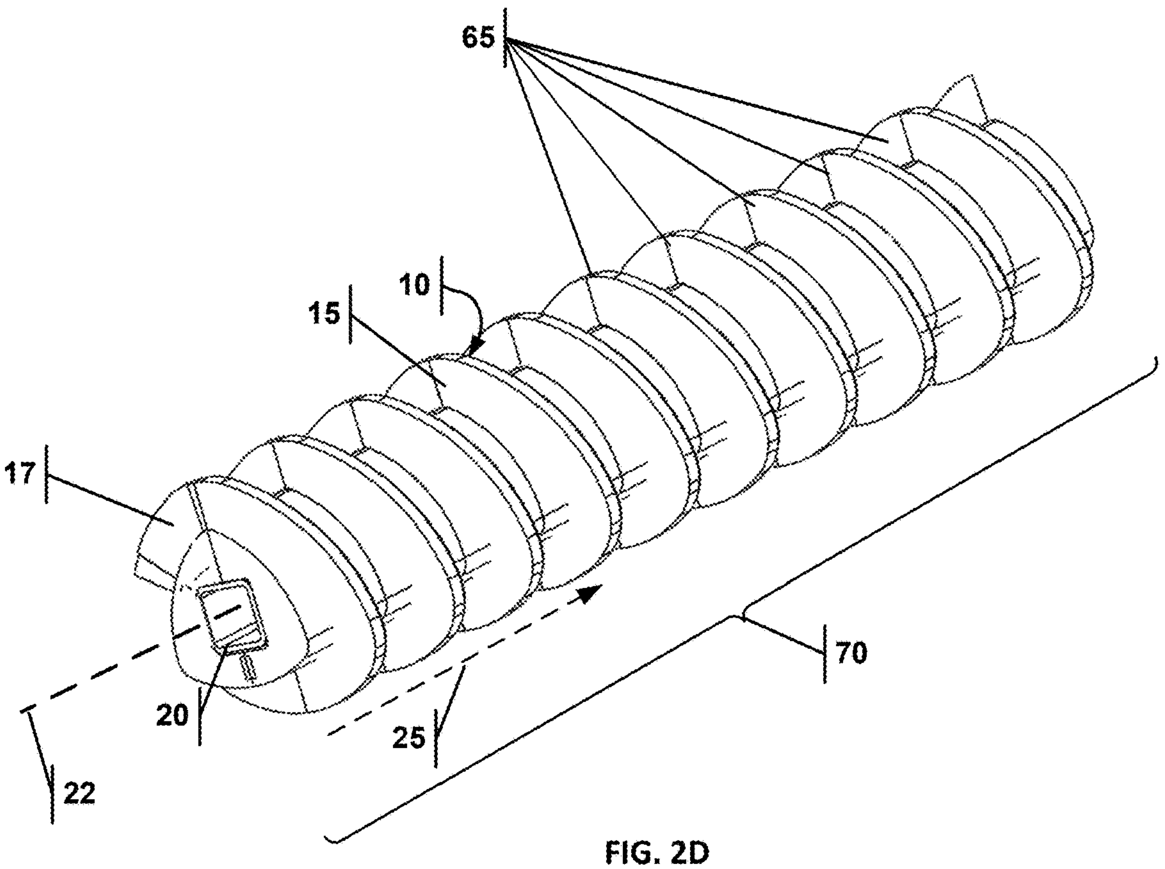
FIG. 2D is a top perspective view of an auger made from several clamshell discs, specifically showing the trailing side of the discs.
Figure 2E:
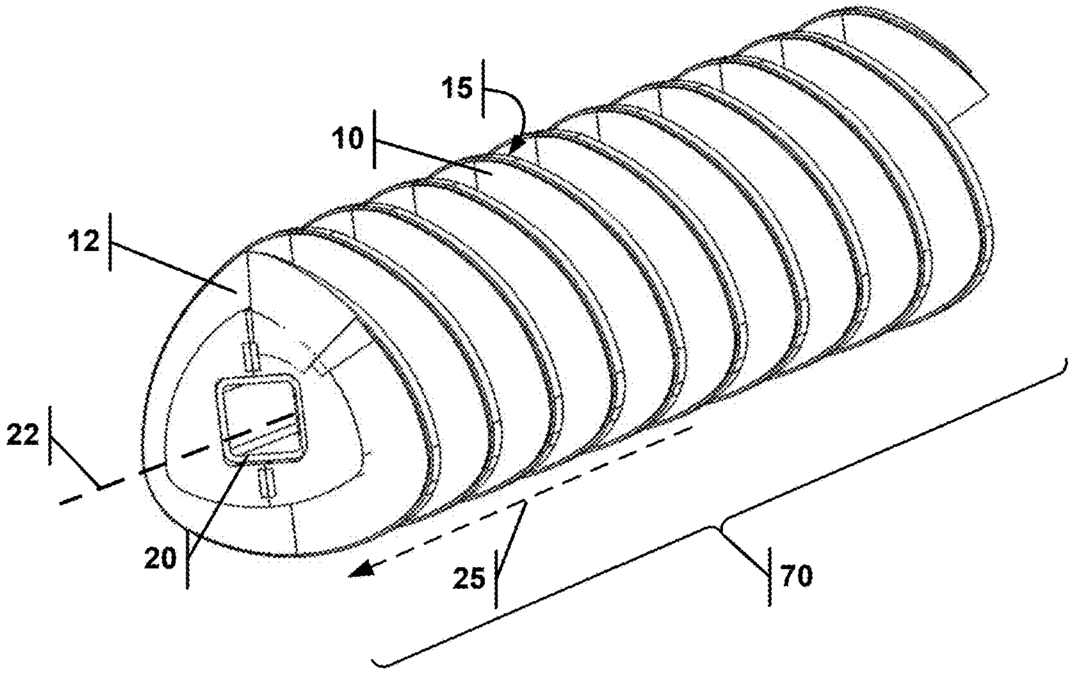
FIG. 2E is a top perspective view of an auger made from several clamshell discs, specifically showing the leading side of the discs.
Figure 2F:
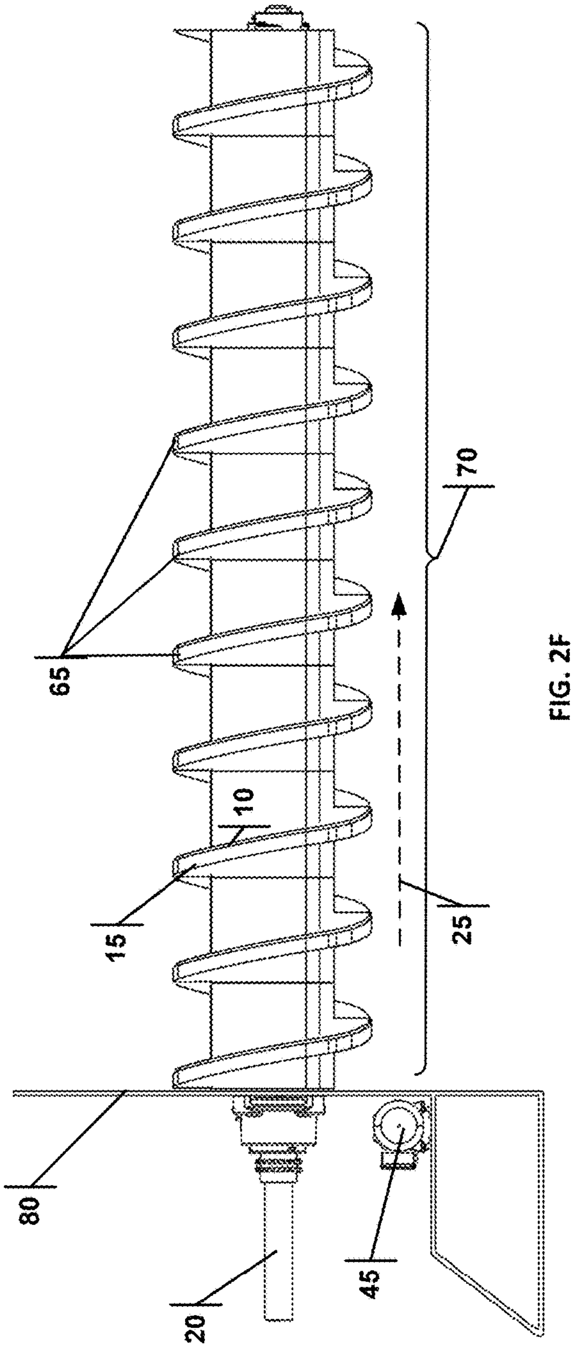
FIG. 2F is a front view of a disc screen made from augers comprised of clamshell discs.
Figure 2G:
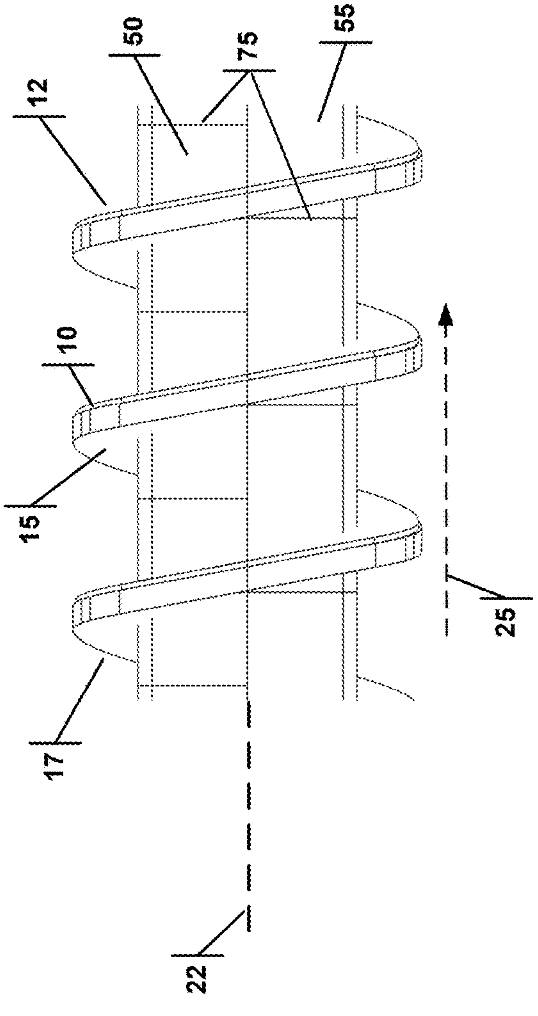
FIG. 2G illustrates the staggered mounting positions of the two clamshell parts on the shaft.

The first part 50 of the clamshell disc 65 is mounted to the disc shaft 20 in a staggered position 75 relative to the mounting of the second part 55, as shown in FIG. 2G. As shown in more detail in FIG. 2A2, an outer edge of the elastomeric material 10 may extend 19 beyond an outer edge of the structural material 10. This allows the elastomeric material 15 to effectively convey material in the radial conveyance direction 35.

In a preferred embodiment, the clamshell disc 65 may have a structural insert 60. This insert 60 is designed to be set in the rubber compression mold, and then the rubber is molded to encase the insert 60. Holes may be included in the insert 60 to provide better engagement between the structural and elastomeric parts.

FIG. 2D illustrates an auger 70 made from several clamshell discs 65, specifically showing the trailing side 17 of the discs 65. FIG. 2E illustrates the same clamshell auger 70 made from several clamshell discs 65, but this view is from the leading side 12 of the discs 65. Material that enters the clamshell auger 70 is pushed by the leading face 12—i.e., the structural material 10—in the axial conveyance direction 25.

Figure 2H:
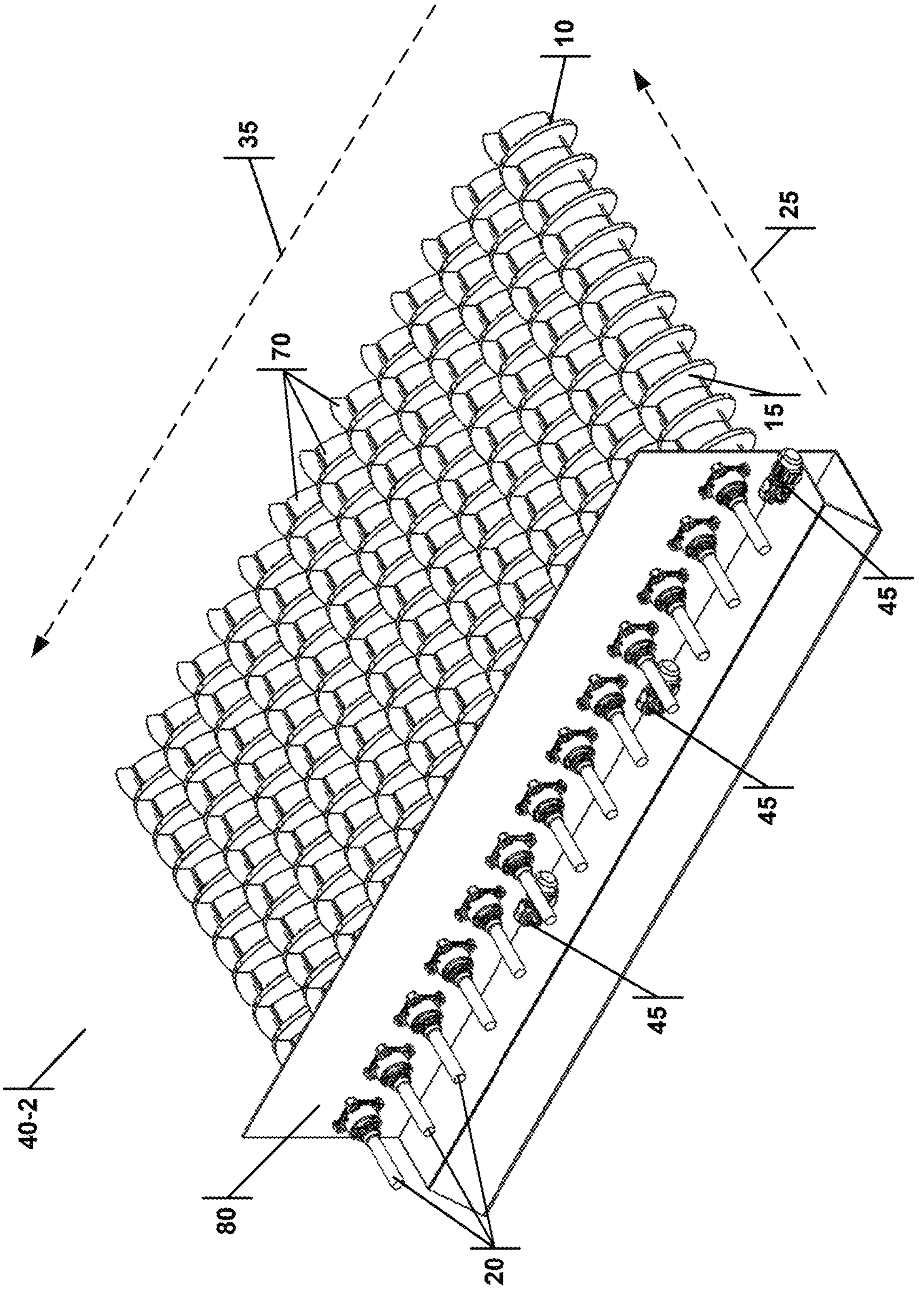
FIG. 2H is a top perspective view of a disc screen made from several augers comprised of clamshell discs

FIGS. 2F and 2H illustrate a disc screen 40-2 made from a plurality of clamshell augers 70. A support frame 80 supports the augers 70 such that each auger 70 in the plurality is parallel to the adjacent auger 70 in the plurality. A motor 45 or set of motors 45 is connected to the disc shafts 20 in the plurality of augers 70, and rotates the disc shafts 20 which, in turn, rotates the clamshell discs 65. The disc screen 40-2 is a roller conveyor that conveys material in the radial conveyance direction 30. Because the elastomeric material 15 extends beyond the structural material (see FIG. 2A2), the uppermost material of the disc screen bed is made of an elastomeric material 15 that advantageously provides sufficient friction to act as a shape sorter.

Figure 3B:
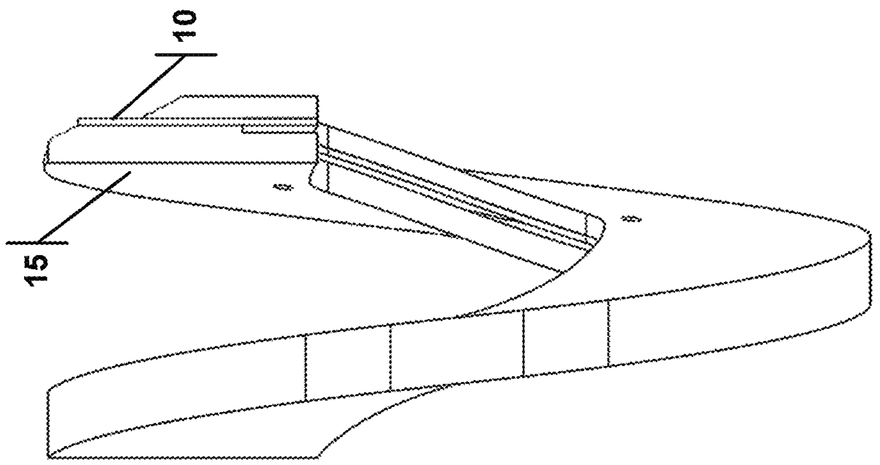
FIG. 3B illustrates the wraparound disc of FIG. 3A with the elastomeric material on the leading face worn off exposing the structural material on the leading face.
Figure 3A:
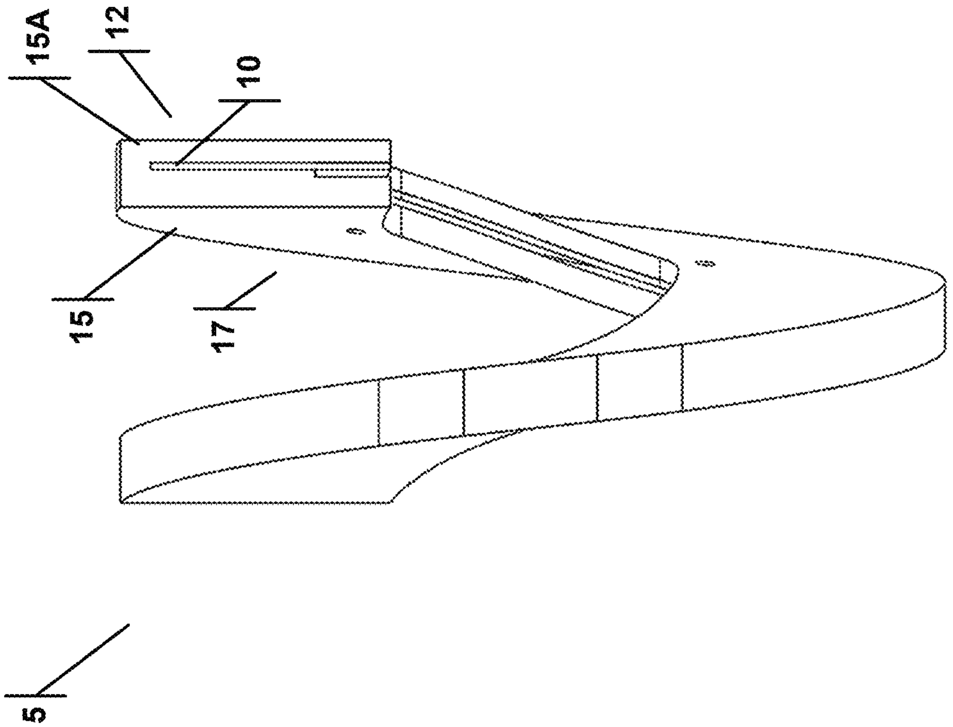
FIG. 3A illustrates a wraparound disc with a sacrificial elastomeric material on the leading face.

FIGS. 3A and 3B illustrate a wraparound disc 5 with a sacrificial elastomeric material 15A on the leading face 12 outside distal face/edge 13 of the wraparound disc 5. After the wraparound disc 5 is installed and put into operation, the sacrificial elastomeric material 15A is constructed to wear away, thereby exposing the durable structural material 10 as the outer surface of the leading face 12. The elastomeric material 15 may be a different material than the sacrificial elastomeric material 15A, or they may be the same material. This embodiment may be easier to manufacture and provides extra grip on the leading face. While the sacrificial elastomeric material 15A is shown on a wraparound disc, the sacrificial material 15A may be implemented in a clamshell disc as disclosed above. Also, this embodiment may be used to construct augers and disc screens as discussed above.

The parallel augers which make up the disc screen are typically cantilevered (as shown in FIGS. 1F, 1G, 2F and 2H), however some of the augers may be supported on both sides.

In a preferred embodiment, the structural material is steel and the elastomeric material is rubber or plastic. Engineering grade wear resistant materials, such as ceramic carbides, may be used in place of structural material.

The structural and elastomeric parts of the disc may be affixed to each other by adhesive, clamps, or fasteners 16.

While this patent document contains many specifics, these should not be construed as limitations on the scope of any invention or of what may be claimed, but rather as descriptions of features that may be specific to a particular embodiment of the invention. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A disc for mounting on a disc shaft (20) with a shaft axis (22), the disc comprising:
- a leading face (12) that pushes material along an axial conveyance direction (25) that is parallel to the shaft axis (22), the leading face (12) is constructed of a structural material comprising metal or ceramic positioned to resist abrasive wear from the axial conveyance of wrapped materials; and
- a distal face/edge (13) constructed of a pliable elastomeric material (15) to provide compliance for shape-based separation.

2. The disc of claim 1, further comprising a trailing face (17) opposite to the leading face (12), the trailing face (17) is constructed of the pliable elastomeric material (15).

3. The disc of claim 1, wherein the disc is a wraparound disc (5).

4. The disc of claim 1, wherein the disc is a clamshell disc (65) comprised of a first part (50) and a second part (55).

5. The disc of claim 4, wherein the first part (50) is mounted to the disc shaft (20) in a staggered position (75) relative to the mounting of the second part (55).

6. The disc of claim 4, wherein the clamshell disc (65) comprises a structural insert (60).

7. The disc of claim 1, wherein the elastomeric material (15) is rubber or plastic.

8. The disc of claim 1, wherein an outer edge of the elastomeric material (15) extends (19) beyond an outer edge of the structural material (10).

9. The disc of claim 1, wherein the structural material (10) is affixed to the elastomeric material (15) by an adhesive, clamp, or fastener (16).

10. An auger for use in a disc screen, the auger comprising:

a disc shaft (20) with a shaft axis (22);

a plurality of discs mounted to the disc shaft (20), each disc in the plurality comprising:

a leading face (12) that pushes material along an axial conveyance direction (25) that is parallel to the shaft axis (22), the leading face (12) is constructed of a structural material comprising metal or ceramic positioned to resist abrasive wear from the axial conveyance of wrapped materials; and a distal face/edge (13) constructed of a pliable elastomeric material (15) to provide compliance for shape-based separation.

11. The auger of claim 10, wherein each disc in the plurality further comprises a trailing face (17) opposite to the leading face (12), the trailing face (17) is constructed of a pliable elastomeric material (15).

12. The auger of claim 10, wherein each disc in the plurality is a wraparound disc (5).

13. The auger of claim 10, wherein each disc in the plurality is a clamshell disc (65) comprised of a first part (50) and a second part (55).

14. The auger of claim 13, wherein the first part (50) is mounted to the disc shaft (20) in a staggered position (75) relative to the mounting of the second part (55).

15. The auger of claim 13, wherein the clamshell disc (65) comprises a structural insert (60).

16. The auger of claim 10, wherein the elastomeric material (15) is rubber or plastic.

17. The auger of claim 10, wherein an outer edge of the elastomeric material (15) extends (19) beyond an outer edge of the structural material (10).

18. The auger of claim 10, wherein the structural material (10) is affixed to the elastomeric material (15) by an adhesive, clamp, or fastener (16).

19. A disc screen comprising:

a plurality of augers, each auger in the plurality comprising:

a disc shaft (20) with a shaft axis (22);

a plurality of discs mounted to the disc shaft (20), each disc in the plurality comprising:

a leading face (12) that pushes material along an axial conveyance direction (25) that is parallel to the shaft axis (22), the leading face (12) is constructed of a structural material comprising metal or ceramic positioned to resist abrasive wear from the axial conveyance of wrapped materials; and a distal face/edge (13) constructed of a pliable elastomeric material (15) to provide compliance for shape-based separation;

a support frame (80) constructed to support the plurality of augers such that each auger in the plurality is parallel to the adjacent auger in the plurality;

a motor (45) or set of motors (45) connected to the disc shafts (20) in the plurality of augers, constructed to rotate the disc shafts (20) in the plurality of augers.

20. The disc screen of claim 19, wherein each disc in the plurality further comprises a trailing face (17) opposite to the leading face (12), the trailing face (17) is constructed of the pliable elastomeric material (15).

21. The disc screen of claim 19, wherein each disc in the plurality is a wraparound disc (5).

22. The disc screen of claim 19, wherein each disc in the plurality is a clamshell disc (65) comprised of a first part (50) and a second part (55).

23. The disc screen of claim 22, wherein the first part (50) is mounted to the disc shaft (20) in a staggered position (75) relative to the mounting of the second part (55).

24. The disc screen of claim 22, wherein the clamshell disc (65) comprises a structural insert (60).

25. The disc screen of claim 19, wherein the elastomeric material (15) is rubber or plastic.

26. The disc screen of claim 19, wherein an outer edge of the elastomeric material (15) extends (19) beyond an outer edge of the structural material (10).

27. A disc for mounting on a disc shaft (20) with a shaft axis (22), the disc comprising:

a leading face (12) that pushes material along an axial conveyance direction (25) that is parallel to the shaft axis (22), the leading face (12) is constructed of an outer pliable sacrificial elastomeric material (15A) with an inner structural material comprising metal or ceramic positioned to resist abrasive wear from the axial conveyance of wrapped materials, wherein the sacrificial elastomeric material (15A) is constructed to wear away during use of the disc, thereby exposing the durable structural material (10) as the outer surface of the leading face (12); and a distal face/edge (13) constructed of a pliable elastomeric material (15) to provide compliance for shape-based separation.

28. The disc of claim 27, further comprising a trailing face (17) opposite to the leading face (12), the trailing face (17) is constructed of the pliable elastomeric material (15).

29. The disc of claim 27, wherein the disc is a wraparound disc (5).

30. The disc of claim 27, wherein the disc is a clamshell disc (65) comprised of a first part (50) and a second part (55).

31. The disc of claim 30, wherein the first part (50) is mounted to the disc shaft (20) in a staggered position (75) relative to the mounting of the second part (55).

32. The disc of claim 30, wherein the clamshell disc (65) comprises a structural insert (60).

33. The disc of claim 27, wherein the elastomeric material (15) and/or the sacrificial elastomeric material (15A) is rubber or plastic.

34. The disc of claim 27, wherein an outer edge of the elastomeric material (15) extends (19) beyond an outer edge of the structural material (10).

35. The disc of claim 27, wherein the structural material (10) is affixed to the elastomeric material (15) by an adhesive, clamp, or fastener (16).

* * * * *